(12) United States Patent
Griffin

(10) Patent No.: US 9,344,520 B2
(45) Date of Patent: May 17, 2016

(54) METHOD AND SYSTEM FOR VISUALIZING SOCIAL CONNECTIONS IN A VIDEO MEETING

(71) Applicant: Cisco Technology Inc., San Jose, CA (US)

(72) Inventor: Keith Griffin, Oranmore (IE)

(73) Assignee: Cisco Technology, Inc., San Jose, CA (US)

( * ) Notice: Subject to any disclaimer, the term of this patent is extended or adjusted under 35 U.S.C. 154(b) by 35 days.

(21) Appl. No.: 14/287,642

(22) Filed: May 27, 2014

(65) Prior Publication Data

US 2015/0350372 A1 Dec. 3, 2015

(51) Int. Cl.
*H04N 7/15* (2006.01)
*H04L 29/08* (2006.01)

(52) U.S. Cl.
CPC ............... *H04L 67/306* (2013.01); *H04N 7/15* (2013.01)

(58) Field of Classification Search
CPC .......... H04N 7/15; H04N 7/14; H04N 7/142; H04L 51/32; H04L 12/588; H04L 12/1822; G06Q 50/01
USPC .............. 348/14.01–14.16; 715/753; 705/319
See application file for complete search history.

(56) References Cited

U.S. PATENT DOCUMENTS

| | | | | |
|---|---|---|---|---|
| 2010/0293247 A1* | 11/2010 | McKee | ................... | G06Q 10/10 709/218 |
| 2011/0022967 A1* | 1/2011 | Vijayakumar | ....... | G06Q 10/107 715/753 |
| 2013/0262653 A1* | 10/2013 | Qu | ..................... | G06Q 30/0277 709/224 |
| 2014/0074471 A1* | 3/2014 | Sankar | ................... | G10L 17/02 704/246 |
| 2014/0081882 A1* | 3/2014 | Govindaraman | ...... | G06Q 50/01 705/319 |
| 2014/0201216 A1* | 7/2014 | Bryant | ........... | G06Q 10/063112 707/748 |
| 2014/0330566 A1* | 11/2014 | Redfern | ................ | G10L 17/005 704/246 |
| 2015/0113060 A1* | 4/2015 | Wahi | ...................... | G06Q 50/01 709/204 |

OTHER PUBLICATIONS

"Gist Company Overview" (AOL 2014).

* cited by examiner

*Primary Examiner* — Melur Ramakrishnaiah
(74) *Attorney, Agent, or Firm* — Samuel M. Katz

(57) ABSTRACT

A method implemented on a computing device for conducting a video conference includes identifying at least some attendees of the video conference, acquiring a social graph associated with at least some of the attendees, and presenting at least a representation of a portion of the social graph to the attendees during said video conference.

18 Claims, 4 Drawing Sheets

METHOD AND SYSTEM FOR VISUALIZING SOCIAL CONNECTIONS IN A VIDEO MEETING

FIELD OF THE INVENTION

The present invention generally relates to improving a video conference experience and particularly, but not exclusively, to providing video conference participants with additional information regarding the other participants.

BACKGROUND OF THE INVENTION

In the field of communications, the role of video conferencing has increased, and more and more enterprises of various sizes and types use video conference tools. Video conference technology is advantageous, as a video conference enables people at two or more distinct locations to interact with each other via two-way video and audio transmissions, thus simulating lifelike face-to-face interactions between people, using advanced visual, audio, and collaboration technologies.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

Figure 1:
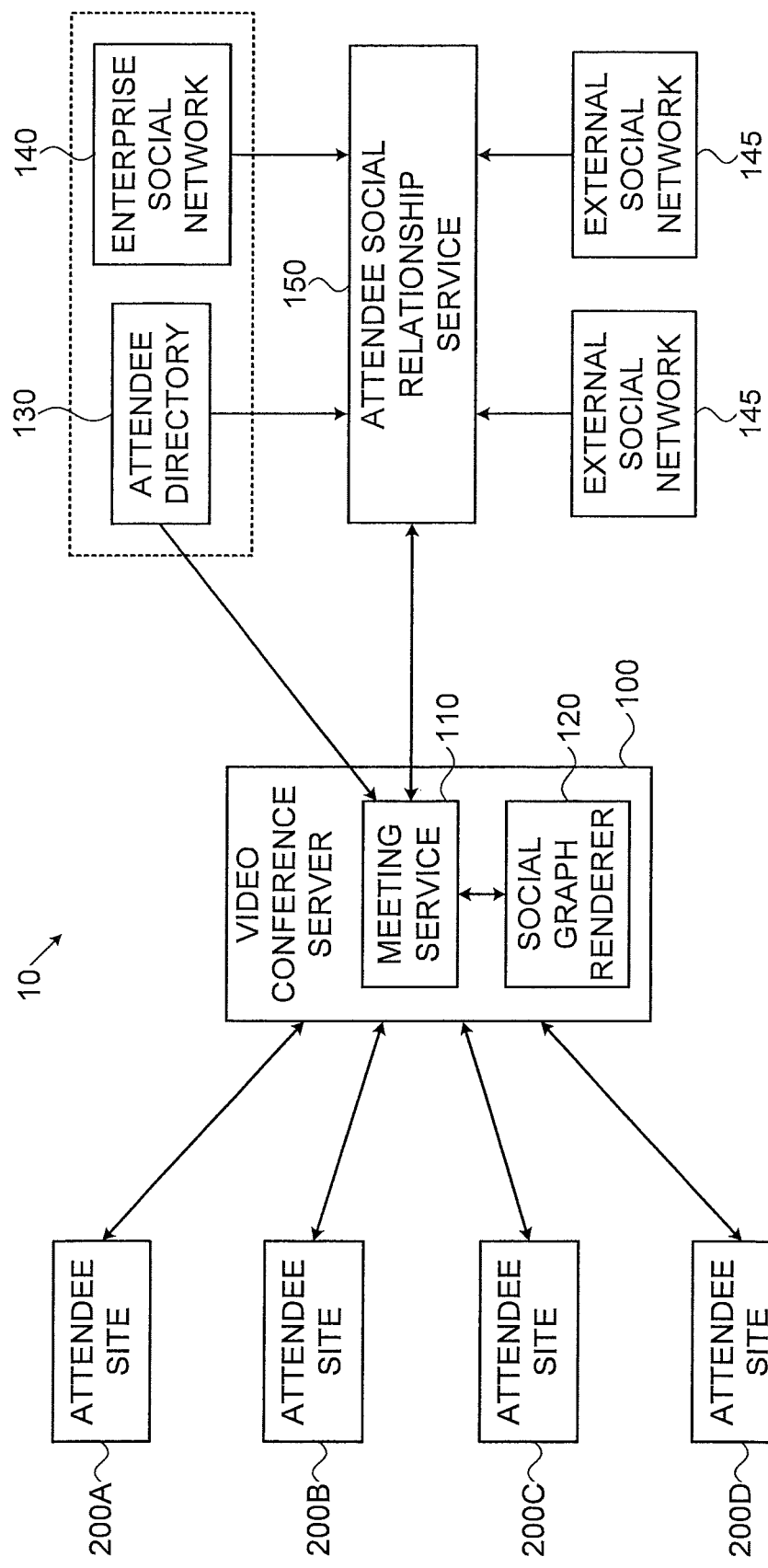
FIG. 1 is a simplified pictorial illustration of an exemplary enterprise video conference system, constructed and operative in accordance with an embodiment of the present invention.

A method implemented on a computing device for conducting a video conference includes identifying at least some attendees of the video conference, acquiring a social graph associated with at least some of the attendees, and presenting at least a representation of a portion of the social graph to the attendees during said video conference.

DETAILED DESCRIPTION OF EXAMPLE EMBODIMENTS

Video conferences are typically set up or initiated by a host participant sending an invitation to one or more invitees. The invitation is typically extended via email and includes a time and date for the conference. Usually, but not necessarily, the invitation also includes at least an indication of the subject of the conference, i.e. a name for the meeting to which the invitees have been invited to participate. An invitee that responds positively to the invitation becomes an attendee, and the video conference may be held at the indicated time and date as per the invitation.

It will be appreciated by those of skill in the art that while the invitations to a video conference may be addressed to individual invitees, or even groups of invitees, a typical video conference system may be indifferent as to who may actually participate in a video conference session, as long as they do so from a site that is registered for use in the given video conference. Some video conferences may even be initiated on an ad hoc basic without being set up ahead of time via invitation. For example, a video conference may be initiated by one attendee directly calling one or more additional attendees on a suitable device such as a video enabled telephone. The added attendees may also call additional attendees to add them to the video conference. Other devices for video conferences may also be configurable to directly access one another without an invitation process to initiate ad hoc video conferences.

Accordingly, from an operational point of view, the participants of a video conference may not necessarily be the host and/or the attendees per se, so much as video conference sites (VCSs) that may or may not be directly or indirectly associated with the host and attendees. Non-invitees may therefore also participate in a given video conference as long as they are present at a site that has the proper credentials to join that given video conference.

A VCS, as will be appreciated by one who is skilled in the art, may typically be, for example, a video conference room, a dedicated video conference unit, a video enabled telephone, or a software based video conference application. Video conference rooms are typically designed to facilitate participation by multiple attendees in a video conference. A basic configuration for a video conference room typically includes a display screen, a video camera and a microphone, as well as a computing device configured to operate and control video conference sessions. More sophisticated configurations typically include one or more additional screens, cameras and/or microphones to provide a richer experience to the attendees. Video conference rooms are typically "booked" or reserved for a video conference session as part of the invitation process. The host participant may book a room for a video conference session by sending the room an invitation in generally the same manner as invitations are sent to prospective attendees. Video conference invitations also typically comprise login information that may be used by the attendees to book a room by either forwarding the invitation to a room of their choosing, or by manually entering the login information in the room in order to join the video conference in session. It will be appreciated that video conference rooms may also be used to initiate or join ad hoc video conferences.

Other VCSs may be configured to be used by a single attendee. For example, a personal VCS may be implemented via a dedicated video conferencing hardware unit comprising at least a display screen with a built-in video camera and microphone, as well as a processor to operate and control the unit. Video enabled telephones may also be used to attend a video conference. A software based video conference application may be implemented on non-dedicated devices, typically on a personal computer with a display screen, a video camera and a microphone. Since a software based video conference application may be implemented on a commonly available personal computer without dedicated hardware, it may provide a low cost, flexible alternative to dedicated video conference rooms and hardware units. Personal VCSs and software based video conference applications may participate in video conferences in a generally similar manner as video conference rooms; i.e. either by invitation, via the entering of login information to join the video conference, or by accepting an ad hoc connection.

Accordingly, it will be appreciated that as noted hereinabove, while video conference invitations may generally be sent to prospective attendees, video conferences per se are typically conducted between VCSs. The video conference system may be indifferent as to the identity of the actual attendees. For example, once a video conference room has been booked for a video conference, anyone who walks through the door at the right time may participate in the video conference. Similarly, invited attendees may bring non-invited colleagues to a video conference without adding them to the list of invitees. U.S. patent application Ser. No. 14/155,843 entitled "DISPLAYING INFORMATION ABOUT AT LEAST ONE PARTICIPANT IN A VIDEO CONFERENCE SESSION", which is assigned to the common assignees of the present invention, discloses methods for providing information about the attendees of a video conference, using, for example, face recognition, voice recognition, site, location and combinations thereof to identify individual attendees.

The inventor of the present invention has realized that it may be beneficial to not only provide information about the attendees of a video conference, but to provide information about the relationships between the attendees as well. For example, whether or not other attendees are connected in some way; which attendees belong to the same organization; which of the attendees is most senior in the organization, etc.

Reference is now made to FIG. 1 which illustrates an exemplary enterprise video conference system 10, constructed and operative in accordance with embodiments of the present invention. System 10 comprises at least one video conference server 100 that may communicate over any suitable means such as known in the art with a multiplicity of attendee VCSs 200.

Server 100 comprises meeting service 110 which provides typical video conference functionality to attendee sites 200. It will be appreciated that video conference server may also comprise at least one I/O module (not shown) such as a transceiver for sending and receiving data, and at least one processor (not shown) operative to at least execute meeting service 110.

Meeting service 110 may be operative to manage a video conference between VCSs 200. It will be appreciated that as discussed hereinabove, VCSs 200 may represent any combination of video conference rooms, dedicated video conference units, and/or ad hoc video conference units.

Enterprise video conference system 10 may also comprise attendee directory 130. Attendee information is typically stored in a persistent data store in attendee directory 130, normally in the form of a database or directory which may typically be implemented as an LDAP based directory such as, for example, Microsoft Active Directory, or any other suitable directory service. It will be appreciated that attendee directory 130 may be integrated as a part of an enterprise contact directory that may be accessed by a video conference's host to invite some or all of the invitees to a given video conference. Attendee details stored by attendee directory 130 may include, for example, attendee name, email address, position, photo, department, location, etc. It will be appreciated that the actual details stored by active directory may be dependent on the configuration of attendee directory 130. It will further be appreciated that relevant details of attendees may be available to meeting service 110 once an invitee has accepted an invitation to attend a given video conference.

Figure 2:
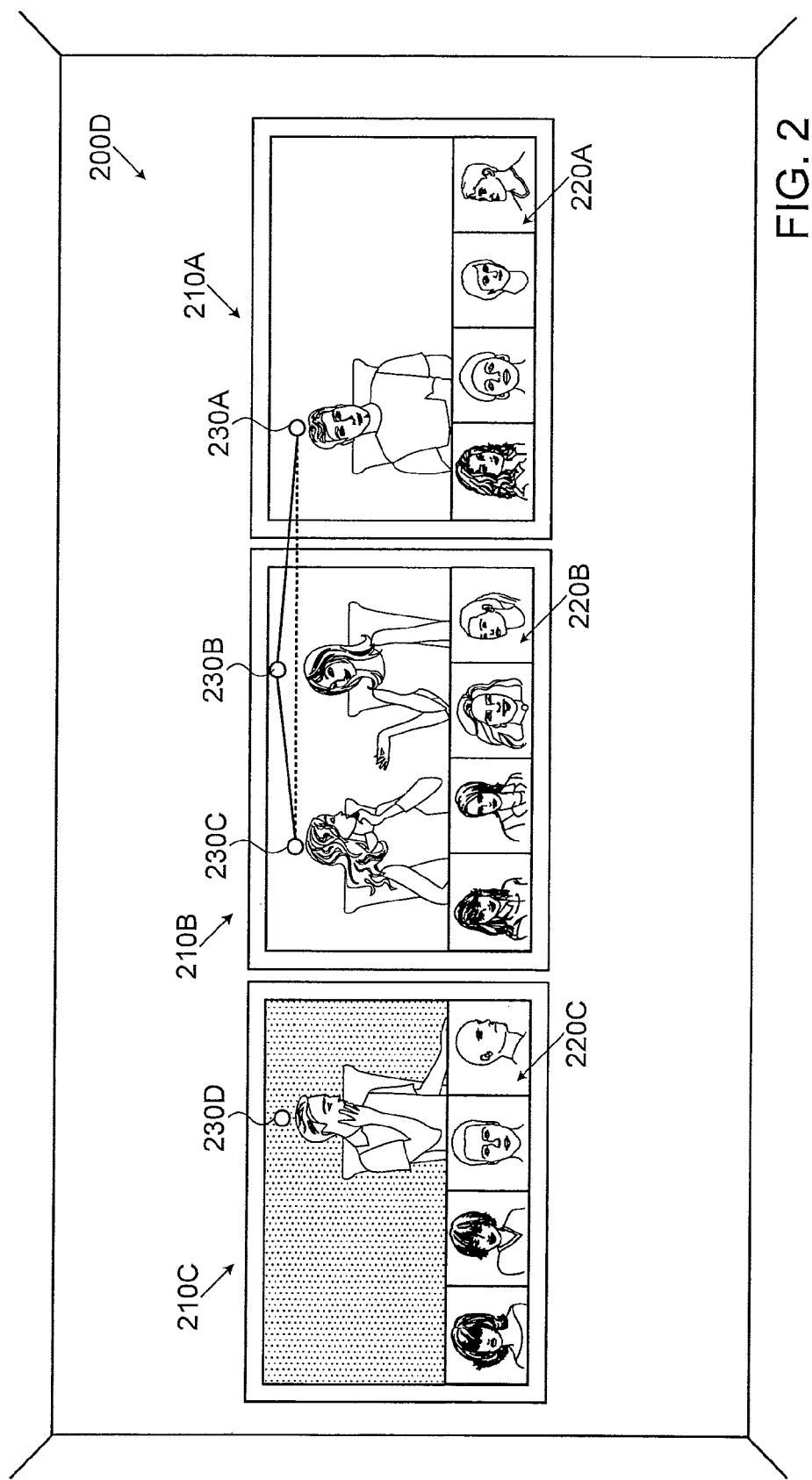
FIG. 2 is a simplified pictorial illustration of a view from within exemplary video conference site from the system of FIG. 2.

Reference is now also made to FIG. 2 which illustrates a view from within exemplary VCS 200D participating in a video conference managed by meeting service 110. It will be appreciated that VCS 200D may be configured as a video conference room with multiple display panels 210, each configurable to be associated with a different VCS 200 participating in the same video conference. For example, display panel 210A may be associated with VCS 200A; display panel 210B may be associated with VCS 200B; display panel 210C may be associated with VCS 200C; and so on. In the example depicted in FIG. 2, VCSs 210A-C are configured with multiple cameras to provide alternative views on display panels 210A-C, depending on who may be speaking and/or other criteria. Thumbnail displays 220 may be reduced versions of the alternative views. It will be appreciated that not all VCSs 200 may be configured to provide thumbnail displays 220. Similarly, it will be appreciated that the depiction of a video conference with four participating VCSs may be exemplary; other configurations may also be supported by the present invention.

It will be appreciated that video conference system 10 may be configured to detect the presence of individual attendees in an ongoing video conference. For example, well known face identification methods may be used to detect the presence of an attendee. In some video conference room configurations with fixed camera and microphone locations, various combinations of movement sensing and/or voice detection methods may also be used to identify the presence of an attendee in a given seat in the room. As depicted in FIG. 2, each of the attendees whose presence may be thusly detected is denoted with a node 230 displayed above their heads.

Returning to FIG. 1, once the attendees are detected, meeting service 110 may determine their identities using a variety of known methods such as those disclosed in U.S. patent application Ser. No. 14/155,843, including, for example, face recognition, voice recognition, site, location and combinations thereof. It will be appreciated that meeting service 110 may access relevant details from attendee directory 130 such as, for example, photos and location, to determine the attendee identities. It will be appreciated that meeting service 110 may not always be successful in identifying the attendees. As discussed hereinabove, some attendees may be from other organizations and/or may not have actually been invited to the video conference. In such cases, there may be insufficient information in attendee directory to successfully identify each attendee.

Enterprise video conference system 10 may also comprise attendee social relationship service 150. It will be appreciated that the depiction of service 150 as a module independent of server 100 may be exemplary; the present invention also supports the integration of service 150 within the functionality of server 100 as well. Meeting service 110 may forward the determined attendee identities to attendee social relationship service 150. The form in which the identities are forwarded may depend on the individual attendee. For example, an attendee identity may be indicated by an email, an employee number, or any other suitable identifier.

Attendee social relationship service 150 may forward the attendee identities to attendee directory 130 with a request to receive details of the indicated video conference attendees. Attendee directory 130 may typically be implemented as an LDAP based directory such as, for example, Microsoft Active Directory, or any other suitable directory service. It will be appreciated that attendee directory 130 may also comprise an enterprise contact list that may have been accessed by a video conference's host to invite some or all of the invitees to the given video conference. Attendee details that may be sent from attendee directory 130 may include, for example, attendee name, email address, position, photo, department, location, etc. It will be appreciated that the actual details stored by active directory may be dependent on the configuration of attendee directory 130.

Attendee social relationship service 150 may also send a request to receive additional input regarding the details of video conference attendees from enterprise social network 140. Enterprise social network 140 may be an internal social network such as Cisco System's WebEx Social®, Microsoft's Yammer, IBM Connections, and/or any other suitable enterprise social network that may be used by an enterprise's employees and possibly other approved contacts. Such networks may typically store information about their members (i.e. employees of the enterprise) such as their areas of interest, hobbies, expertise, past experience, education, etc. Such networks may also be operative to enable their members to "follow" other members, or to become their "friends" or "buddies", each of which entails the forming of some kind of relationship between two or more members. Members may also join groups of members with common interests.

Service 150 may collate information about relationships between a video conference's attendees from attendee directory 130 and/or enterprise social network 140. Service 150 may then forward the collated information to meeting service 110. As will be discussed hereinbelow, service 110 may use the collated information to enhance the video conference experience for some or all of the attendees.

Meeting service 110 may forward the collated information to social graph renderer 120. Social graph renderer 120 may be operable to render a social graph for the identified attendees based on the information collated by attendee social relationship service 150. It will be appreciated that social graphs are known tools for mapping relationships and characteristics of social network members. The resulting social graph may provide insight as to relationships between the attendees of a video conference.

In accordance with some embodiments of the present invention, alternatively or in addition, system 10 may be configured to use previously rendered social graphs and/or social graphs available from external sources. As will be discussed hereinbelow, social graphs rendered for a given video conference session may be saved for use in subsequent video conference. Also, social graphs for identified attendees may be available via API from external sources such as LinkedIn or Facebook. Accordingly, in some embodiments of the present invention, meeting service may be configured to acquire a social graph from sources (either internal or external to system 10) other than social graph renderer 120.

Meeting service 110 may use at least a portion of the rendered social graph to enhance the video conference taking place in VCS200D. For example, as shown in FIG. 2, there may be a solid line connecting node 230A and node 230B. In such manner meeting service 110 may indicate that these two attendees are connected to each other in some way such as, for example, they are friends in enterprise social network 140. A dashed line, such as that between nodes 230A and 230C may indicate that the associated attendees are not connected. Alternatively, a dashed line may indicate a degree of connection, i.e. the associated attendees are indirectly connected by a common connection with the attendee associated with node 230B. A third degree of connection may be indicated by a dotted line, and so on. Per the example in FIG. 2, the absence of any lines connecting to node 230D may indicate that none of the other attendees are known to be connected with the attendee associated with node 230D.

It will be appreciated that the use of solid and dashed lines may be exemplary; in operation system 10 may support configurable graphical representation to indicate a variety of possible relationships between attendees. For example, relationships may also be indicated by background colors; employees from one division may have a light blue background, whereas employees from another division may have a light green background. For example, in FIG. 2, the background of display panel 210C may be shaded to indicate that associated VCS 200C is an external site not associated with the enterprise of system 10. In another example of possible graphical representations of relationship, an attendee "following" another employee may be indicated by an arrow connecting their associated nodes 230; attendees following each other may be indicated by a bidirectional arrow.

It will be appreciated that system 19 may be configured to provide similar functionality for relationships involving attendees appearing in thumbnails 220. Furthermore, system 10 may be configured to present relationships between attendees displayed in both display panels 210 and thumbnails 220.

System 10 may also support the representation of multiple relationships. For example, one set of lines may indicate social network connections, e.g. friends or followers, and a second set of lines or a background color scheme may represent work relationships, e.g. members of the same group. In some configurations, a badge or label may also be superimposed onto the display in order to provide information such as, for example, the seniority of one attendee vis-à-vis another, e.g. if one of the attendees is the CEO. Alternatively, seniority may be indicated by the relative placement of the associated node 230, e.g. the associated node 230 may be displayed at a higher point in display panel 210.

In accordance with embodiments of the present invention, the configuration and level of display of attendee relationship may also be configurable on a per site basis. For example, whereas VCS 200D may be configured to use solid lines to show which attendees displayed on display panels 210 are connected to each other socially, VCS 200A may be configured to use background colors to indicate which attendees may belong to which divisions in the workplace.

It will be appreciated that the representation of attendee relationships may be restricted by policy. For example, certain representations may be restricted according to seniority and/or function within the enterprise. Human resource personnel may be entitled to view group relationships that may not be available to other personnel. Also, as discussed hereinabove, some attendees, for example the attendee associated with node 230D, may be from outside the enterprise. It may be beneficial to restrict their access to information regarding internal or external relationships. Accordingly the presentation of attendee relationships may be filtered or restricted in accordance with policies.

As discussed hereinabove, meeting service 110 may be unable to successfully identify all of the attendees of a video conference. It will be appreciated that it is not uncommon for an invited attendee to ask another person to attend a video conference with them or instead of them. Under such circumstances, the uninvited attendee may be difficult or even impossible to find in attendee directory 130.

For example, if a photo from attendee directory 130 is used to identify attendees using face recognition, it may be generally relatively easy to identify a given attendee from among the participants of a video conference. When analyzing faces from among a discrete pool of candidates, generally the closest match is the correct one, and an identification may be made with high confidence even if there is not a one-to-one match of features. Any discrepancies may be assumed to be artifacts of different poses, resolutions, and/or lighting conditions. Another attendee may also be asked for input to confirm an identification and/or to select from among a limited number of candidate identifications. However, it may not always be feasible to prompt another attendee for such input, for example, if the identified attendee is from outside the enterprise, it's possible that none of the "trusted" attendees from inside the enterprise are capable of making an identification. Furthermore, if the attendee is not from among the invited attendees, it may be necessary to search an enterprise directory of hundreds or thousands of candidates, greatly reducing the confidence of any match.

In accordance with embodiments of the present invention, the characteristics and/or relationships of the attendees that have been identified may be used to identify other attendees. For example, if there are three attendees participating from a given VCS and two of them have been identified, the common relationships and/or characteristics of the two identified attendees may be used to narrow the search for the third attendee. If, for example, both of the identified attendees work in the same department or if they are friends in enterprise social network 140, identification attempts for the third attendee may focus on other workers in the same department or among their friends, thereby increasing the chances of a successful match.

It will be appreciated that attendees that are not associated with the enterprise of system 10 may still have publicly accessible information that may be used to identify them. In accordance with embodiments of the present invention, service 150 may also access external social networks 145 for information regarding the attendees of a video conference. Typical non-limiting examples of external social networks 145 are Facebook® and LinkedIn®. Members of such networks typically have public and private profiles. The Inventor of the present invention has realized that the information in the public profiles, particularly if it includes details such as a photo, name or place of employment, may be used to identify uninvited attendees.

In an exemplary scenario, display panel 210B as depicted in FIG. 2 may be associated with an external VCS 200, not included with the enterprise of system 10. The attendee represented by node 230B may have been invited by the video conference host and identified as per the methods discussed hereinabove. However, the attendee represented by node 230C may not have been invited and accordingly may not be identifiable by such methods.

However, the attendee of node 230B may have an account in an external social network 145 whose privacy settings allow non-friends to view a list of the attendee's friends. Service 150 may access external social network 145, e.g. Facebook, to search for a profile associated with the identified attendee, typically using an email to identify the profile. Service 150 may then access the profile and forward the public details of the attendee's friends list to meeting service 110. If, for example, photos are included in these details, they may be analyzed to search for a match for the attendee indicated by node 230C. If a match is found, the public details regarding the now identified attendee that were provided in connection with the account belonging to the attendee of 230B may be used by social graph renderer 120 to map relationships with other attendees of the video conference.

Alternatively or in combination, system 10 may also support the use of private profile information to identify attendees. For example, it will be appreciated that some or all of the identified attendees may be associated with the enterprise of system 10, i.e. they may be employees of the organization operating system 10. In accordance with some embodiments of the present invention, these associated attendees may permit service 150 to use their account name and password to broaden the search for unidentified attendees. For example, the account name and password may be entered into attendee directory 130 and/or enterprise social network with access granted to service 150. When seeking to identify unidentified attendees, service 150 may use these account names and passwords to access the private profiles of the identified attendees to search for more characteristics that may be used to identify other attendees.

Alternatively, or in combination, other characteristics of the attendee indicated by 230B may be used to search one or more external social networks 145 to find a match for the attendee indicated by 230C. For example, known details regarding the attendee indicated by 230B may typically include an email. Email domains are often indicative of a business's name which may be used to search an external social network 145 such as, for example, LinkedIn, for matches with a profile listing the indicated business as a current place of employment. It will be appreciated that other known characteristics associated with the attendee of node 230B, such as, for example, profession, city of residence, alma mater, etc. may be leveraged similarly either singly or in combination.

It will be appreciated that once an attendee may have been identified in such a manner, other external social networks may be accessed using whatever identifying information may now be available, including, for example, either a name, or a name in combination with other details such as place of employment, alma mater, etc. In such manner, additional information may be harvested to be used by social graph renderer 120 to map the relationships of the now identified attendee with the rest of the attendees. It will similarly be appreciated that if an attendee may have provided system 10 with an account name and password for an external social network 145, the private information thereby accessed may also be used to augment the information used by social graph renderer As discussed hereinabove, the relationships displayed on display panels 210 and thumbnails 220 may be configurable, subject to access policies. It will be appreciated that VCSs 200 may be configured with a user interface for configuring how the relationships may be displayed for that particular VCS 200. It will similarly be appreciated that system 10 may also comprise a user interface for configuring system wide settings and defaults, as well as for setting access policies.

It will be further appreciated that it may be beneficial to enable individual attendees sharing a VCS 200 with other attendees to select individual settings for relationship display. In accordance with some embodiments of the present invention, video conference rooms may be configured with individual consoles operative to display personalized versions of attendee relationships as per settings entered by individual attendees. Alternatively, or in combination, attendees may also use companion devices such as, for example, personal computers, laptops, tablets and smartphones to configure and provide a personalized attendee relationship display.

Figure 3:
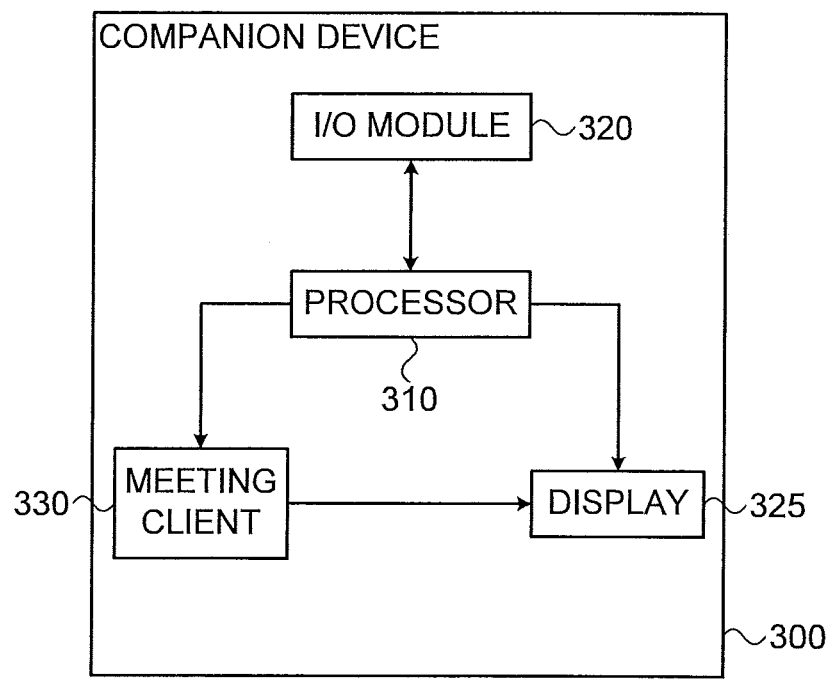
FIG. 3 is a schematic illustration of companion device operative for use with the system of FIG. 3.

Reference is now made to FIG. 3 which is a block diagram drawing of an exemplary companion device 300 for use in the system of FIG. 1. Companion device 300 comprises hardware and software components, such as are well-known in the art. Companion device 300 comprises at least one processor 310, I/O module 320, display 325 and meeting client 330.

It will be appreciated that companion device 300 may comprise more than one processor 310. For example, one such processor 310 may be a special purpose processor operative to execute meeting client 330 to configure and manage a personalized relationship display to be displayed on display 325 which may typically, although not necessarily, be a touch screen operative to receive additional inputs from the viewer. I/O module may typically be a transceiver operative to use protocols such as are known in the art to provide communications at least between meeting client 330 and other elements of system 10. In embodiments of the present invention companion device 300 may provide alternate versions of the relationships displayed on display panels 210 and thumbnails 220 per device specific settings.

It will be appreciated that companion devices 300 may be employed by an individual attendee to perform and displayed relationship inquiries without affecting the overall experience of the video conference as experienced by other attendees in the same VCS 200. Such relationship inquiries may be also be performed via the user interface of a VCS 200 (and the results displayed on display panels 210 and/or thumbnails 220), but it may be more convenient to do so on a personal companion device 300. For example, instead of configuring a certain type of relationship to be displayed, e.g. friends, division or work site, a relationship inquiry may search all the information collated by service 150 for any connection between a specific attendee and anyone else in the video conference. A typical scenario for such an inquiry may be for an attendee to make a self-focused inquiry regarding how all the other attendees are related (if at all) to the inquiring attendee.

Another typical scenario for using such an inquiry may be when conducting a video conference with an attendee external to the enterprise of system 10. If the external attendee is relatively unknown, it may be beneficial to find someone else in the video conference with something in common with the external attendee. Such an inquiry may yield a result such as, for example, the external attendee and two other attendees are both lawyers or volunteer firefighters. It will be appreciated that if display 325 is a touch screen, such an inquiry may be initiated by tapping on the focus of the inquiry, i.e. per the scenario, the user of companion device 300 may tap on the image of the external attendee. It will be appreciated that other gestures such as for example double taps, swipes, circling, etc. may also be configured to initiate such an inquiry.

In another scenario, an inquiry may be to find any connection between two or more specific attendees. For example, if external attendees from two different organizations are attending the video conference, such an inquiry may reveal if they are somehow connected. In yet another scenario, an inquiry may be to find connections between one or more attendees and anyone in the enterprise. As discussed in the context of the previous scenario, the two external attendees may be selected for the inquiry by the user tapping on display 325.

It will be appreciated that the need for such information may not be specific to conducting the video conference per se, however system 10 may leverage the fact that the data required for such inquiries may be available as a byproduct of the relationship mapping process. In order to further leverage the output of social graph renderer 120, social graphs may also be saved for further analysis and display after a video conference has ended. In accordance with some embodiments of the present invention, two or more saved social graphs may also be merged to identify relationships between attendees of different video conferences.

It will be appreciated that the resources required to generate such social graphs may be dependent both on the number of attendees in a given video conference, as well as the extent of the information available regarding their social relationships. In order to conserve such resources, saved social graphs may also be used by system 10 as starting points and/or references for subsequent video conferences including some or all of the same attendees. For example, if a given attendee attends three video conferences in the same day, service 150 may be configured to reuse the attendee's collated relationship information from the first meeting of the day for the next two meetings without accessing social networks 140 and 145 for updates. Similarly, if two attendees jointly attend two video conferences in the same day, the intersection of their social graphs may be reused for the second video conference. It will be appreciated, however, that there may be changes to an individual's social graph during the course of the day; system 10 may be configured as to how long saved information may be used.

It will be appreciated that system 10 may in fact be configured to facilitate such changes in an attendee's social graph. In accordance with embodiments of the present invention, system 10 may be operative to provide social connection suggestions to non-connected attendees of the video conference. For example, if two attendees are not connected in enterprise social network 140 and/or an external social network 145, system 10 may send suggest that one or both of the attendees connect with the other.

Alternatively or in addition, system 10 may detect two attendees that are connected in one social network, i.e. enterprise social network 140 or an external social network 145, and based on that connection, system 10 may suggest that they connect in the second network. For example, two attendees may already be connected in enterprise social network 140, and both attendees may already have non-connected accounts in the same external social network 145. System 10 may then suggest that they connect in external social network 145 as well.

It will be appreciated that the circumstances for such suggestions may be configurable. System 10 may be configured with default rules and circumstances for sending such suggestions. For example, depending on the configuration, the suggestions may or may not be limited to members of the enterprise; suggestions may or may not only be extended at the beginning/end of a video conference; and so. The suggestions may typically be in the form of emails to attendees. Alternatively or in addition, system 10 may use APIs from social networks 140 and 145 to provide the suggestions to the attendees.

It will be appreciated that the relationships mapped by social graph renderer 120 may also be based on historical data, i.e. non-current statuses. For example, the profiles of two attendees in enterprise social network 140 may indicate that in the past they both attended the same university or were both previously employed at the same place of employment. System 10 may be configured to display such historical relationships as well.

Figure 4:
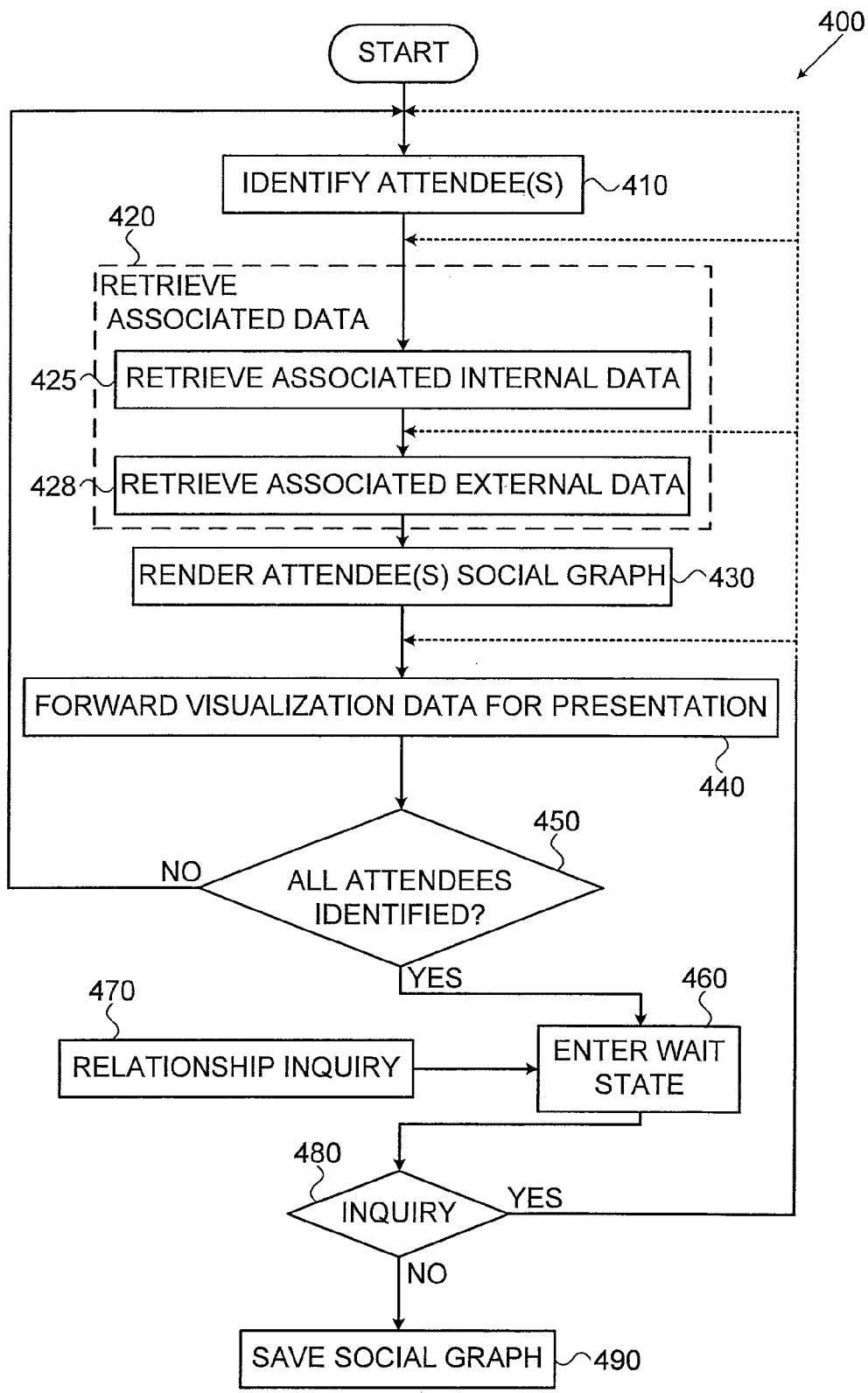
FIG. 4 is a block diagram of a process to be executed by the system of FIG. 1.

Reference is now made to FIG. 4 which illustrates social connection visualization process 400. Process 400 may be performed by meeting service 110 in accordance with embodiments described hereinabove to at least render and present visualizations of social connections between attendees of a video conference. Meeting service 110 may identify (step 410) attendees of a video conference using, for example, face recognition, voice recognition, site, location and combinations thereof.

Meeting service 110 may retrieve (step 420) relationship data associated with the identified attendees as collated by service 150. It will be appreciated that step 420 may comprise both retrieving (step 425) associated data from internal sources such as attendee directory 130 and enterprise social network 140, as well as retrieving (step 428) similar data from external social networks 145.

Meeting service 110 may employ social graph renderer 120 to render (step 430) a social graph based on the data received from service 150. Meeting service 110 may forward (step 440) visualization data based on the rendered social graph for presentation at one or more of the participating video conference sites.

If all of the attendees have already been identified (step 450), process 400 may enter (step 460) a wait state to wait for a relationship inquiry (step 470) from an attendee or video conference site or the end of the video conference. If all of the attendees have not been identified (step 450), control may return to step 410 where the additional data available from the social graph may be employed to attempt to identify remaining unidentified attendees as described hereinabove. It will be appreciated that in order to conserve processing resources, meeting service 110 may be configured with a limit as to how many times control may loop back to step 410. Once the limit may be reached, control may flow through to step 460 regardless of whether or not all attendees may be identified.

If a relationship inquiry is received (step 480), control of process 400 may then proceed according to the nature of the inquiry. For example, if an inquiry is received regarding the identity of a given attendee, process 400 may return to step 410. It will be appreciated that such a request may be received regardless of whether or not the indicated the indicated attendee was previously identified. For example, such an inquiry may be initiated by an attendee that disagrees with a previously made identification.

It will be appreciated that system 10 may be configurable to selectively limit the information retrieved by service 150. Accordingly, some relationship inquiries may be used to ask for additional information not included in a standard presentation. In response to such inquiries, process 400 may return to steps 425 or 428 in order to retrieve the additional information. It will also be appreciated that step 470 may also be used by attendee to personalize the presentation at their VCS and/or on their companion devices 300. In such cases, control may return to step 440.

If the video conference has ended, i.e. the wait state of step 460 was not ended by a relationship inquiry (step 480), meeting service 110 may save (step 490) some or all of the rendered social graph, and process 400 may end.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method implemented on a computing device for conducting a video conference, the method comprising:
   detecting the presence of individual attendees in said video conference; and
   identifying at least one of said individual attendees using at least one of face recognition, voice recognition, site, location, or combinations thereof;
   accessing social network profiles associated with attendees of said video conference;
   for a non-identified individual attendee for whom said identifying individual attendees is unsuccessful, identifying said non-identified individual attendee at least according to information from one of said accessed social network profiles associated with at least one of said identified individual attendees;
   mapping at least relationships between at least some of said attendees at least according to information in said profiles, thereby generating a social graph of said attendees; and
   presenting at least a representation of a portion of said social graph to said attendees during said video conference.

2. The method according to claim 1 and wherein said portion of said social graph represents relationships between said attendees, wherein said relationships are at least one of: shared characteristics, and or connections in a social network.

3. The method according to claim 1 and wherein said identifying non-identified individual attendee comprises:
   identifying said non-identified individual attendee from among connections of at least one of said identified individual attendees attending said video conference, wherein said connections are procured via said accessing.

4. The method according to claim 1 and wherein said identifying a non-identified individual attendee comprises:
   searching at least one social network for public profiles of members sharing at least one common characteristic with at least one said identified attendee attending said video conference; and
   identifying said non-identified individual attendee from among said public profiles.

5. The method according to claim 4 and wherein said at least one common characteristic is at least one of an email domain, a place of employment, a site, or location, or a combination thereof.

6. The method according to claim 1 and wherein said social network profiles are from an enterprise social network associated with an enterprise with which said computing device is associated.

7. The method according to claim 1 and wherein said social network profiles are from a social network external to an enterprise with which said computing device is associated.

8. The method according to claim 1 and wherein said relationships are at least in part based on non-current statuses of said attendees.

9. The method according to claim 1 and wherein said presenting may comprise forwarding said representation of at least a portion of said social graph to a companion device for presentation, wherein said companion device is at least one of a smartphone, a tablet, a laptop or a personal computer.

10. The method according to claim 9 and wherein said representation of at least a portion of said social graph is configurable in accordance with requests by a user of said companion device.

11. The method according to claim 1 and also comprising:
    receiving a request for a representation of relationships between at least one specific attendee and at least one other attendee;
    generating said representation of relationships based at least on said social graph; and
    forwarding said representation of relationships for presentation to a video conference site associated with said request.

12. The method according to claim 1 and also comprising restricting said presenting in accordance with a policy.

13. The method according to claim 1 and also comprising saving said social graph.

14. The method according to claim 13 and also comprising merging two saved social graphs.

15. The method according to claim 13 and also comprising using at least a part of said saved social graph to generate a new social graph for a subsequent video conference.

16. The method according to claim 1 and also comprising:—based on said social graph, suggesting to at least one attendee to connect with at least one other said attendee using said social network profiles.

17. A video conference user interface implemented on a computing device, the user interface comprising:
   an attendee social relationship service operative to at least:
      detect the presence of individual attendees in a video conference,
      identify at least one of said individual attendees using at least one of face recognition, voice recognition, site, location, or combinations thereof,
      access at least one social network to receive information regarding profiles of video conference attendees,
      for a non-identified individual attendee for whom said identifying individual attendees is unsuccessful, identify said non-identified individual attendee at least according to information from one of said accessed social network profiles associated with at least one of said identified individual attendees, and
      identify a non-identified individual attendee according to at least said information associated with at least one of said identified individual attendees;
   a social graph renderer operative to render a social graph based at least on said information from said enterprise social network; and
   a meeting service to provide a presentation of at least a part of said social graph to at least one video conference site participating in an associated video conference.

18. The system according to claim 17 and also comprising a video conference site comprising at least one display operative to display said presentation.

* * * * *